United States Patent
Gindler et al.

(10) Patent No.: US 11,694,683 B2
(45) Date of Patent: Jul. 4, 2023

(54) SYSTEMS AND METHODS FOR CONTROLLING A FUEL PUMP

(71) Applicant: Wayne Fueling Systems LLC, Austin, TX (US)

(72) Inventors: David Gindler, Austin, TX (US); Hob Hairston, Cedar Park, TX (US); Henry Fieglein, Leander, TX (US); Lukasz Cisek, Cracow (PL)

(73) Assignee: Wayne Fueling Systems LLC, Austin, TX (US)

( * ) Notice: Subject to any disclaimer, the term of this patent is extended or adjusted under 35 U.S.C. 154(b) by 256 days.

(21) Appl. No.: 17/075,347

(22) Filed: Oct. 20, 2020

(65) Prior Publication Data

US 2022/0122598 A1    Apr. 21, 2022

(51) Int. Cl.
| | |
|---|---|
| G10L 15/22 | (2006.01) |
| B67D 7/14 | (2010.01) |
| B67D 7/34 | (2010.01) |
| G06F 21/32 | (2013.01) |
| G10L 15/08 | (2006.01) |

(52) U.S. Cl.
CPC .............. G10L 15/22 (2013.01); B67D 7/145 (2013.01); B67D 7/34 (2013.01); G06F 21/32 (2013.01); G10L 15/08 (2013.01); *G10L 2015/088* (2013.01); *G10L 2015/223* (2013.01); *G10L 2015/227* (2013.01)

(58) Field of Classification Search
USPC .......................... 704/246, 247, 251, 252, 275
See application file for complete search history.

(56) References Cited

U.S. PATENT DOCUMENTS

| | | | |
|---|---|---|---|
| 4,660,153 A * | 4/1987 | Yamashita | ................ B67D 7/08 222/39 |
| 6,510,416 B1 * | 1/2003 | Lad | ....................... B67D 7/0401 141/94 |
| 10,577,238 B1 * | 3/2020 | Chamoun | ................ B67D 7/04 |
| 2007/0274533 A1 | 11/2007 | Lewis | |
| 2017/0148113 A1 * | 5/2017 | Yasko | ..................... G06Q 40/04 |
| 2021/0294385 A1 * | 9/2021 | Williams | ................ B67D 7/067 |

FOREIGN PATENT DOCUMENTS

CN          109399541 A      3/2019

OTHER PUBLICATIONS

International Search Report and Written Opinion received for PCT Application No. PCT/US2021/054364, dated Feb. 10, 2022, 13 pages.

* cited by examiner

*Primary Examiner* — Leonard Saint-Cyr
(74) *Attorney, Agent, or Firm* — Mintz Levin Cohn Ferris Glovsky and Popeo, PC (57) ABSTRACT

A method of controlling a fuel pump includes receiving a first set of data characterizing an audible activation word including a first voice pattern. Control of the fuel pump is authorized in response to the first voice pattern matching a stored voice pattern within a database. A second set of data characterizing an audible command word is received, where the audible command word includes a second voice pattern. The fuel pump is controlled based on the audible command word in response to the second voice pattern matching the stored voice pattern within the database.

18 Claims, 6 Drawing Sheets

FIG. 6

SYSTEMS AND METHODS FOR CONTROLLING A FUEL PUMP

TECHNICAL FIELD

This disclosure generally relates to systems and methods for controlling a forecourt of fuel pumps, and more specifically, to systems and methods for controlling a forecourt of fuel pumps using audible commands.

BACKGROUND

Forecourt fuel systems are used to authorize the dispensing of fuel into transportation vehicles. The fuel is dispensed through fuel pumps fluidly coupled to a large fuel tank. A forecourt can contain multiple fuel pumps, which each fuel pump having to be controlled by the forecourt controller. In order to activate a fuel pump, a user must manually activate the pump through a physical interface, where the user needs to identify the correct fuel pump on a forecourt controller and the amount of fuel to be dispensed, for example, a gas station attendant. For each separate fuel dispensing process, the user must correctly enter the information through the physical interface. In some instances, for example, a very busy timeframe at the forecourt, the user will have to manually enter each fuel dispensing process one at a time.

Not only can this process be cumbersome and inefficient, there may be little to no security around the physical interface. This could allow an unauthorized user to access the physical interface to activate an unauthorized fuel dispensing process and multiple pumps within the forecourt.

SUMMARY

In general, systems and methods for controlling fuel pumps arranged within a forecourt using audible commands are provided.

In one aspect, a method is provided and includes receiving a first set of data characterizing an audible activation word including a first voice pattern. Control of at least one fuel pump from a plurality of fuel pumps is authorized in response to the first voice pattern matching a stored voice pattern within a database, in which each of the plurality of fuel pumps is communicatively connected to a forecourt controller. A second set of data characterizing an audible command word is received, where the audible command word includes a second voice pattern. The at least one fuel pump is controlled based on the audible command word in response to the second voice pattern matching the stored voice pattern within the database.

In other aspects, the method can further receiving a third data set characterizing an audible termination word including a termination word and a third voice pattern, comparing the third voice pattern of the audible termination word to the database, and terminating the authorization control of the at least one fuel pump in response to the third voice pattern matching the stored voice pattern within the database. The authorization control of the at least one fuel pump can terminate after a predetermined time.

In other aspects, the database can be wirelessly connected to the at least one fuel pump. The database can include a plurality of stored voice patterns. The stored voice patterns can be previously recorded activation words and command words that each correspond to a different user.

In other aspects, the method can include receiving a third data set characterizing an audible emergency word, comparing the audible emergency word to a stored emergency word within the database, and disabling the at least one fuel pump in response to the audible emergency word matching the stored audible emergency phrase within the database.

In other aspects, the method can include receiving a third data set characterizing an audible emergency word including an emergency word and a third voice pattern; comparing the third voice pattern of the audible emergency word to the database, and activating an emergency procedure in response to the third voice pattern matching the stored voice pattern within the database. The emergency procedure can include terminating operation of a fuel pump closest to a location where the third data set was received, terminating operation of any active fuel pumps within the forecourt, and/or announcing an audible emergency signal.

In other aspects, the audible command word can be a predetermined word stored within the database. The audible command word can activate the at least one fuel pump and/or controls the at least one fuel pump to dispense a specific amount of fuel. A plurality of audible command words can be received during the authorization control of the at least one fuel pump. The stored voice pattern can correspond to a voice pattern of a user.

In another aspect, a system is provide and includes a forecourt controller, a database, a voice recognition controller, and an audio sensor. The forecourt controller is configured to activate at least one fuel pump of a plurality of fuel pumps based on an audible command word including a voice pattern. The database is communicatively connected to the forecourt controller and configured to contain a plurality of stored voice patterns. The voice recognition controller is communicatively connected to the forecourt controller and configured to compare the voice pattern of the audible command word to the plurality of stored voice patterns. The audio sensor is communicatively connected to the voice recognition controller and configured to receive the audible command word from a user. The at least one fuel pump is activated in response to the voice pattern of the audible command word matching at least one of the plurality of stored voice patterns.

In other aspects, the database can be wirelessly connected to the forecourt controller. The at least one fuel pump can be activated in response to the voice pattern of the audible command word matching at least one of the plurality of stored voice patterns. The system can further include a second audio sensor arranged proximate to the at least one fuel pump and configured to receive an audible emergency word.

In another aspect, a system is provide and includes a plurality of fuel pumps arranged in the forecourt, a forecourt controller, a database, a voice recognition controller, and an audio sensor. The plurality of fuel pumps are arranged in the forecourt. The forecourt controller is communicatively connected to each fuel pump of the plurality of fuel pumps. The database is communicatively connected to the forecourt controller and configured to contain a plurality of stored voice patterns. The voice recognition controller is communicatively connected to the forecourt controller. The audio sensor is communicatively connected to the voice recognition controller. The system is configured to: receive a first set of data characterizing an audible activation word including a first voice pattern; authorize control of at least one fuel pump of the plurality of fuel pumps in response to the first voice pattern matching a stored voice pattern within a database; receive a second set of data characterizing an audible command word, wherein the audible command word includes a second voice pattern; and control the at least one fuel pump based on the audible command word in response to the second voice pattern matching the stored voice pattern within the database.

In other aspects, the system can further include a second audio sensor arranged proximate to the fuel pump and configured to receive an audible emergency word. The authorization control of the at least one fuel pump can terminate after a predetermined time.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF THE DRAWINGS

A brief description of each drawing is provided to more sufficiently understand drawings used in the detailed description of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Forecourt fuel systems can be used to authorize the dispensing of fuel through individual fuel pumps arranged within the forecourt. The fuel pumps are in communication with a forecourt controller which authorizes the fuel pumps to dispense fuel when an authorization signal is sent to the forecourt controller. The forecourt controller can receive an authorization signal in various forms, including, but not limited to, an input through a physical interface or an audible input through an audio sensor. In the case of the audible input, the forecourt controller needs to verify from the audible signal the meaning of what the audible signal is trying to convey to the system, and whether the audible signal is coming from an authorized user. The system can include determining both what the audible signal is trying to convey to the system, and if the audible signal is coming from an authorized user, by comparing the voice pattern of the audible signal to a plurality of stored commands and voice patterns stored within a database in communication with a voice recognition controller and the forecourt controller. The advantages of an audible signal can include an increase in both efficiency and security, since an authorized user can verbal give commands quicker than those same commands can be inputted via a physical interface, while ensuring only authorized users are inputting commands into the system.

Figure 1:
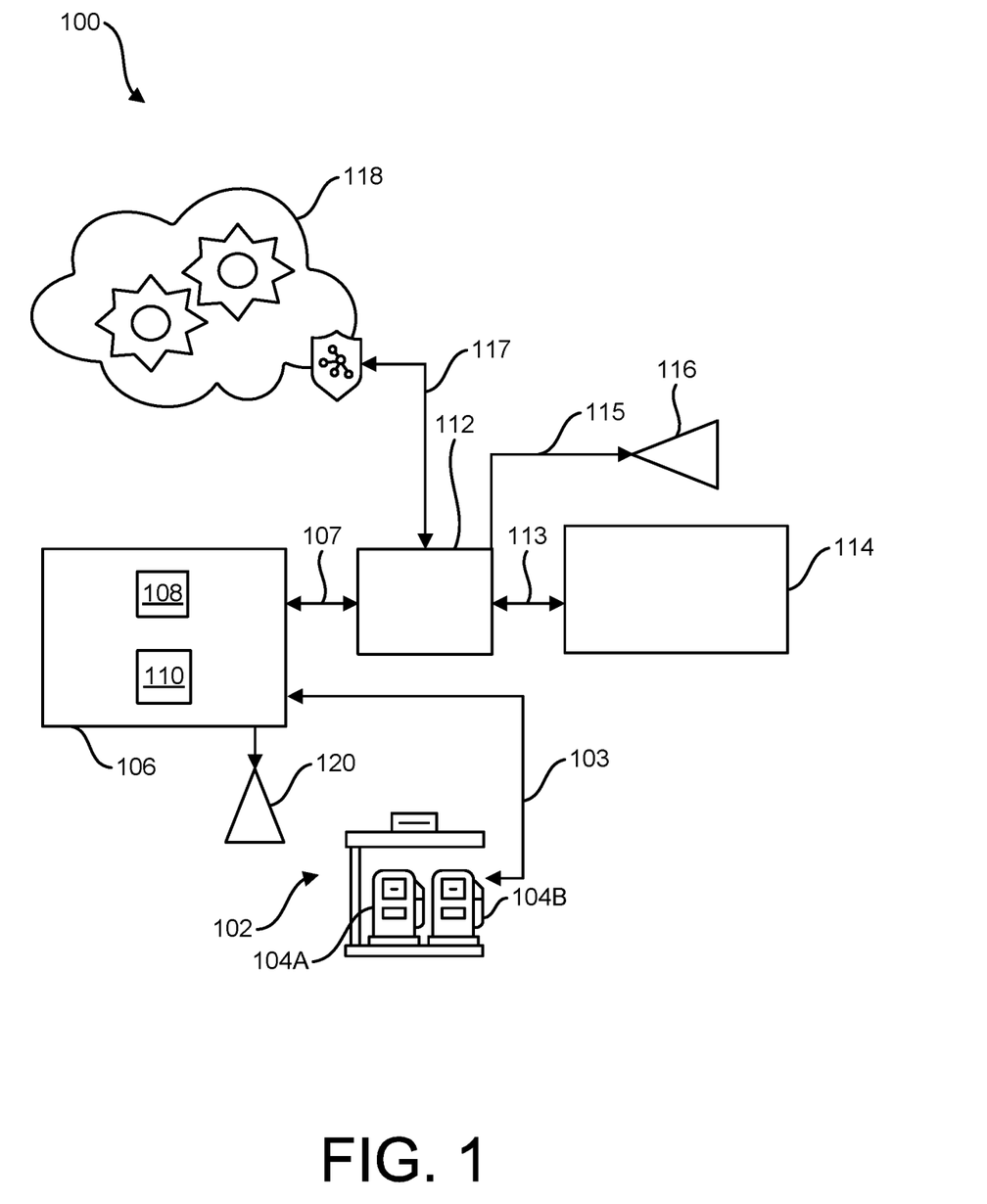
FIG. 1 is a schematic view of a forecourt control system according to one embodiment.

FIG. 1 shows one embodiment of a forecourt control system 100. The illustrated forecourt control system 100 includes a forecourt 102 having fuel pumps 104A and 104B. The forecourt 102 can include a plurality of fuel pumps or any type of dispenser. The fuel pumps 104A, 104B are communicatively connected to a forecourt controller 106 along connection 103. The forecourt controller 106 includes a processer 108 and a computer readable memory 110, and is used to control each individual fuel pump 104A, 104B within the forecourt 102. The forecourt controller 106 is able to authorize the dispensing of fuel for each fuel pump 104A, 104B. In some implementations, the forecourt controller 106 is a general purpose computer which is communicatively connected to the other components of the forecourt control system 100.

In order for the forecourt controller 106 to activate the fuel pumps 104A, 104B, the forecourt controller 106 needs to receive an authorization signal from the voice recognition controller 112 or the user input controller 114. While using the forecourt control system 100 in a non-voice operation mode, a user can manually input various commands into the user input controller 114. An example of a manual entry can include a user selecting a specific fuel pump number and the amount of fuel to be dispensed by the fuel pump. This information can be transmitted to the forecourt controller 106, which then in turn can activate the corresponding fuel pump in the forecourt 102. This manual entry signal can pass from the user input controller 114 through the voice recognition controller via connections 107 and 113 to the forecourt controller 106.

In the event that a user can want to use the forecourt control system 100 in a voice activation mode, the user can input an audible wake word and command through the audio sensor 116. In some implementations, the audio sensor 116 is a microphone arranged within close proximity to a user operating the forecourt control system 100 so that any audible signals can be picked up by the audio sensor 116. The audio sensor 116 is communicatively connected to the voice recognition controller 112 through connection 115, and the like. The audio sensor 116 may be active in a passive listening mode, where the audio sensor 116 is listening to every word said by and to a user operating the forecourt control system 100. However, the audio sensor 116 may only send a signal to the voice recognition controller 112 if a specific wake word, command word, termination word, emergency word, etc. is picked up by the audio sensor 116.

In some implementations, wake words may include generic words or phrases such as "activate" or "turn on". Command words may include words or phrases such as "output" or "dispense fuel". Termination words may include words or phrases such as "end", "terminate", or "shut off". Even though specific examples of words and phrases are given, it should be appreciated that various other words and phrases may be used in order to operate the forecourt control system 100.

In the event that a specific wake word, command word, termination word, or emergency word is detected by the audio sensor 116, the audio sensor 116 can record the specific word said and the voice pattern associated with the word. The audio sensor 116 can send this recording to the voice recognition controller for analysis to determine if the user who stated the wake word, command word, termination word, or emergency word is actually authorized to operate the forecourt control system 100. In order to determine if a user is properly authorized to operate the forecourt control system 100, the voice recognition controller 112 can communicate with a database 118 through connection 117 in order to compare the voice pattern contained in the recorded word to a plurality of pre-recorded and stored voice patterns. In some implementations, prior to an authorized user beginning to operate the forecourt control system 100, the user can record multiple wake words, command words, termination words, emergency words, etc., where the user's voice pattern for each word or phrase can be recorded and stored in the database 118. So when an authorized user passes an audible input through the audio sensor 116 to the voice recognition controller 112, the voice recognition controller 112 can compare the voice pattern in the audible input to every stored voice pattern within the database 118. If the voice pattern of the audible input matches one of the stored voice patterns within the database 118, then the voice recognition controller can send an authorization command to the forecourt controller 106 in order to operate one of the fuel pumps 104A, 104B.

The database 118 may be a hard drive located in close proximity to the forecourt, or may be a wireless database located in the cloud, which can be continually updated with the voice patterns of new users being added and the voice patterns of old users being removed. Additionally, all of the connections 103, 107, 113, 115, and 117 between the components of the forecourt control system 100 may be wired or wireless connections.

In some implementations, the forecourt control system 100 may further include a second audio sensor 120. The audio sensor 120 may be arranged in close proximity to the fuel pumps 104A, 104B for the purpose of detecting an emergency word said by any person in or around the forecourt 102. For example, the audio sensor 120 may be directly arranged on the fuel pump 104A and is in a passive listening mode for specific emergency words, such as "fire" or "help". Since these emergency words are not user specific, the audio sensor 120 can be directly communicatively connected to the forecourt controller 106. However, the audio sensor 120 can be communicatively coupled to the voice recognition controller 112 also.

Figure 2:
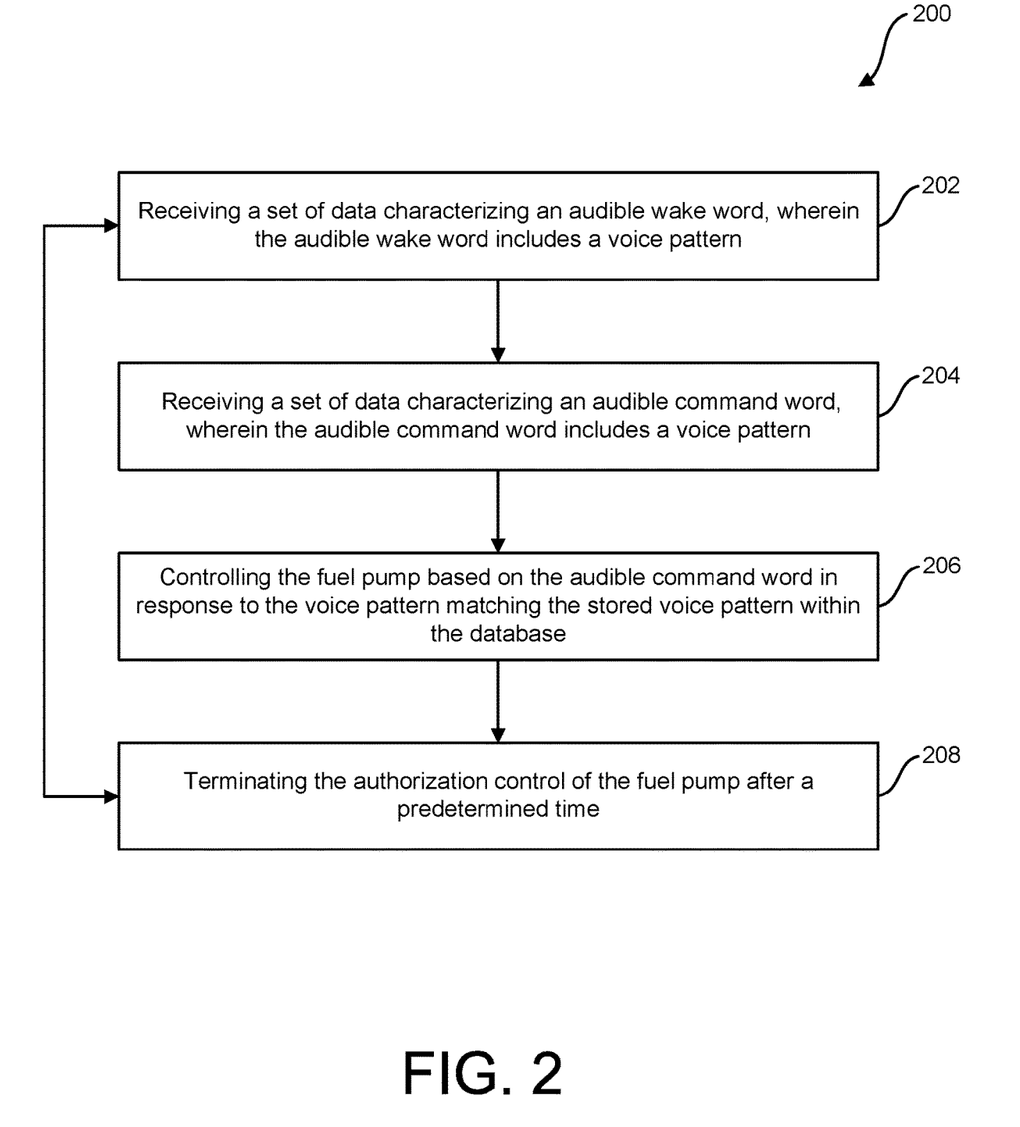
FIG. 2 is a schematic view of a method of activating a fuel pump using a wake word, according to one embodiment.

Referring now to FIG. 2, a method 200 of activating the fuel pumps 104A, 104B using a wake word is depicted. The method 200 may include the following steps, where each time a user wants to activate the fuel pumps 104A, 104B, a new wake word and command word needs to be input into the audio sensor 116 for each separate command.

Step 202 includes receiving a set of data characterizing an audible wake word, where the audible wake word includes a voice pattern. The first set of data is sent from the audio sensor 116 to the voice recognition controller 112 for further analysis. The analysis includes determining if a wake word was said, and if a wake word was said, was the wake word said by an authorized user based on the voice pattern of the wake word.

Step 204 includes receiving a set of data characterizing an audible command word, where the audible command word includes a voice pattern. Similar to the input of the wake word, a command word can follow the wake word substantially close in time, and in some implementations, in the same phrase. For example, steps 202 and 204 can be represented in the phrase "activate pump one for three gallons," where "activate" is the wake word and "pump one for three gallons" is the command word or phrase. Both the wake word and the command word can have separate voice patterns analyzed by the voice recognition controller 112. This is to ensure that a non-authorized user does not hijack the command word after an authorized user has already stated the wake word. With both voice patterns form the wake word and command word, the voice patterns are analyzed by the voice recognition controller 112.

Step 206 includes controlling the fuel pump 104A, 104B based on the audible command word in response to the voice pattern matching the stored voice pattern within the database 118. Once the voice pattern of the command word is matched to a stored voice pattern of an authorized user within the database 118, the authorization signal can be sent to the forecourt controller 106 from the voice recognition controller 112. The forecourt controller 106 can then send an activation signal to the corresponding fuel pump 104A, 104B within the forecourt 102.

Step 208 includes terminating the authorization control of the fuel pump after a predetermined time. When a wake word and a command word are detected by the audio sensor 116, and both the wake word and command word include voice profiles that match an authorized user's voice profile, the authorization of the corresponding fuel pump can terminate. For example, once fuel pump 104A is activated by an authorized user audibly saying "activate pump one for three gallons," the forecourt control system will not recognize any additional commands stated after the command word of "pump one for three gallons". Each individual command word must be preceded by an individual wake word. This is represented by an arrow connecting step 208 to step 202. In method 200, every time a user wants to authorize a fuel pump using a command word, a wake word must also be used. In some implementations, if a wake word is audibly stated by a user, the forecourt control system 100 can remain in an active listening state for a predetermined amount of time after the wake word is detected by the audio sensor 116. This is to compensate for a delay between a user activing the system and determining exactly what command to input into the forecourt control system 100. If the predetermined amount of time does pass from the detection of a wake word with no command word detected, the system can cancel the authorization started by the wake word, and a wake word will need to be detected again prior to the voice recognition controller 112 authorizing a command word.

Figure 3:
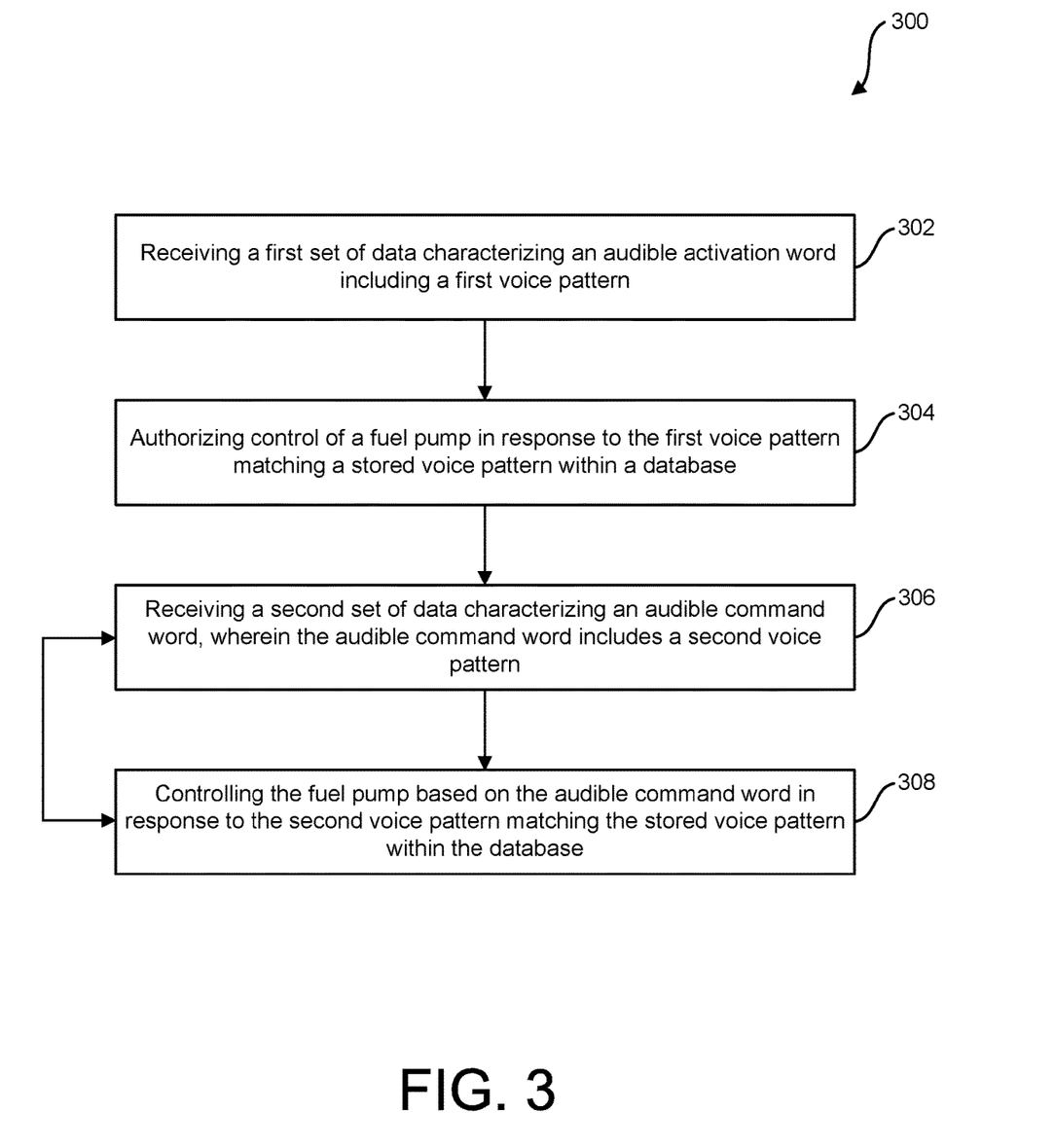
FIG. 3 is a schematic view of a method of authorizing a fuel pump to receive a string of commands according to one embodiment.

Referring now to FIG. 3, a method 300 of authorizing a fuel pump to receive a string of commands is depicted. The method 300 depicts the forecourt control system 100 operating in a string-command mode, or a "rush period" where multiple commands can be given to the forecourt control system 100 without the need for an individual wake word prior to each command word.

Step 302 includes receiving a first set of data characterizing an audible activation word including a first voice pattern. The activation word may be similar to a wake word, and can be unique to each user. The activation word is used to engage the rush period, where individual wake words with each command will no longer be necessary. In some implementations, the rush period can only last a predetermine time, or can last indefinitely but must be ended with a termination word. Similar to when a wake word is detected by the audio sensor 116, when an activation word is detected by the audio sensor 116, the audio sensor 116 sends the data set including the activation word and the corresponding voice pattern to the voice recognition controller 112. Once the data set is transferred to the voice recognition controller 112, the voice recognition controller 112 can perform a comparison analysis with all the stored activation words and voice patterns stored within the database 118.

Step 304 includes authorizing control of a fuel pump 104A, 104B in response to the first voice pattern matching a stored voice pattern within a database 118. If the voice pattern of the activation word matches a stored voice pattern stored in the database 118, a rush period to initiate, where control of the fuel pumps 104A, 104B is authorized where no individual wake word is required before command phrases.

Step 306 includes receiving a second set of data characterizing an audible command word, and where the audible command word includes a second voice pattern. Unlike the method 200, which can require a wake word for each command word, method 300 only requires the activation word, and then multiple command words can be inputted by the user. However, even though multiple strings of commands can be input into the forecourt control system 100, each individual command word still requires a matching voice pattern of an authorized user. As each command word in a string of command words is detected by the audio sensor 116, a voice pattern matching process is occurring for each command within the voice recognition controller 112. A string of commands may be represented by "pump one for two gallons, pump two for 4 gallons." In this example, there are two command words/phrases, a command word for pump one and a command word for pump two. The forecourt control system 100 can individually authorize both command words separately to ensure that an authorized user inputted the commands. In the rush period, the forecourt control system 100 is passively listening for command words, but not wake words.

Step 308 includes controlling the fuel pump 104A, 104B based on the audible command word in response to the second voice pattern matching the stored voice pattern within the database 118. In the event that a command word is determined to be from an authorized user based on the voice patterns, the forecourt controller 106 can authorize the corresponding fuel pump 104A, 104B to activate and dispense the authorized amount of fuel. This cycle between steps 306 and 308 can continue until the rush period ends based on a predetermined time limit or a termination word is inputted by an authorized user.

Figure 4:
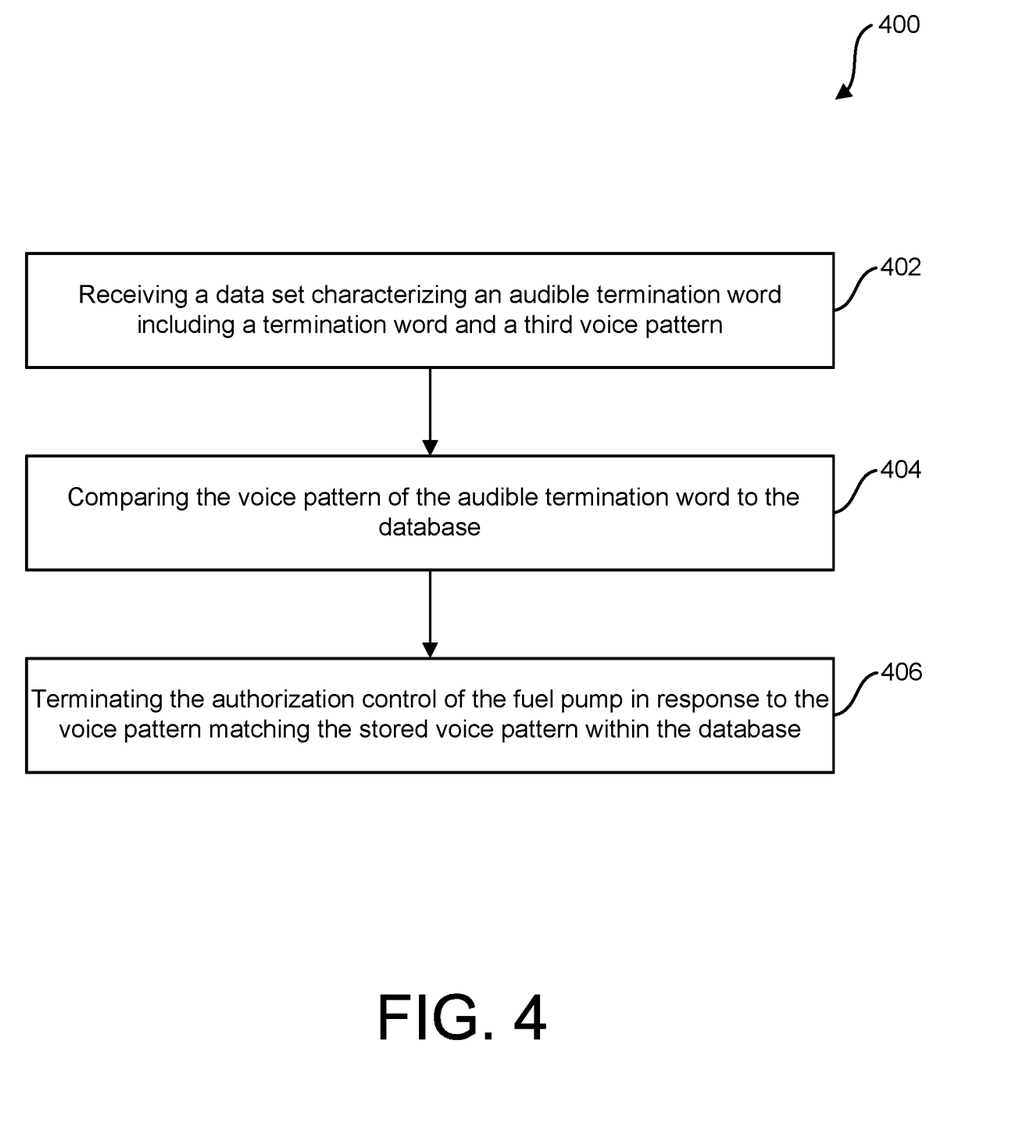
FIG. 4 is a schematic view of a method of terminating the authorization of the fuel pump shown in FIG. 3, according to one embodiment.

Referring now to FIG. 4, a method 400 of terminating the authorization of the fuel pump from the method 300 is depicted. The method 400 depicts a termination process of a rush period in the event that a user wants to end a rush period.

Step 402 includes receiving a data set characterizing an audible termination word including a termination word and a voice pattern. Similar to wake words and command words, termination words are prerecorded words and voice patterns stored in the database 118 for authorized users. While the forecourt control system 100 is in a rush period, an authorized user may input a termination phrase into the audio sensor 116.

Step 404 includes comparing the voice pattern of the audible termination word to the database 118. To ensure that an authorized user is terminating the rush period, the termination word and its corresponding voice pattern are compared to the stored voice patterns within the database 118 by the voice recognition controller 112.

Step 406 includes terminating the authorization control of the fuel pump 104A, 104B in response to the voice pattern matching the stored voice pattern within the database 118. If the voice pattern of the termination word matches with a stored voice pattern, then the rush period can be terminated. From that point on, a single wake word will need to precede each individual command word in order to authorize a fuel pump 104A, 104B, as represented in method 200 of FIG. 2.

Figure 5:
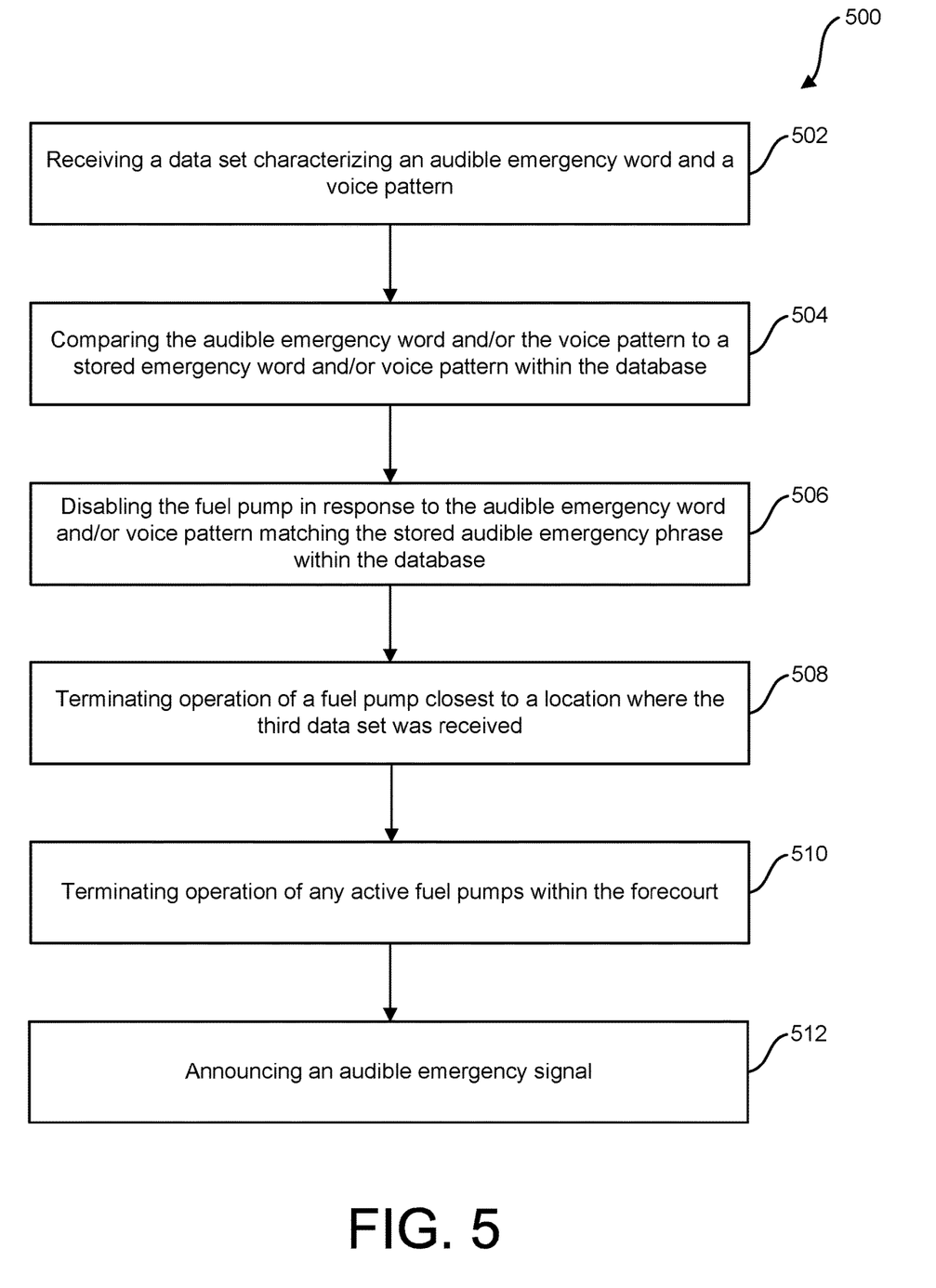
FIG. 5 is a schematic view of a method of an emergency procedure according to one embodiment.

Referring now to FIG. 5, a method 500 of an emergency procedure is depicted. The method 500 depicts how the forecourt control system 100 can react if an emergency event is detected by the audio sensors 116 or 120.

Step 502 includes receiving a data set characterizing an audible emergency word and/or a voice pattern. In some implementations, a voice pattern may not be required, but only the emergency word. In this scenario, a bystander may notice an emergency situation in the forecourt 102 prior to the authorized user, and the bystander might call out for help, or some other word or phrase usually associated with an emergency situation. In some embodiments, there is a plurality of audio sensors 120 arranged around the forecourt 102 so that an emergency word may be detected in any location within the forecourt 102.

Step 504 includes comparing the audible emergency word and/or the voice pattern to a stored emergency word and/or voice pattern within the database 118. As stated previously, the forecourt control system 100 is passively listening to the surrounding area of the forecourt through audio sensors 116 and 120. Therefore, if a bystander or user audibly inputs an emergency word into the audio sensors 116, 120, the voice recognition controller 112 may compare the emergency word/phrase and/or voice pattern against stored emergency words and voice patterns.

Step 506 includes disabling the fuel pump 104A, 104B in response to the audible emergency word and/or voice pattern matching the stored audible emergency phrase within the database 118. In the event that an emergency word is detected by the audio sensors 116 and 120, and the emergency word is verified by the voice recognition controller 112, then a disable signal can be sent to the forecourt controller 106, so that the forecourt controller 106 can disable any active fuel pumps within the forecourt 102 in order to attempt to contain the emergency situation.

Step 508 includes terminating operation of a fuel pump 104A, 104B closest to a location where the emergency word of the data set was received. Once the disable signal is sent from the forecourt controller 106 to the fuel pumps 104A, 104B, the disable signal can be directed to the fuel pump that is experiencing the emergency situation. For example, if a fire starts around fuel pump 104A, then the emergency word may include a location of the emergency, or the audio sensor 120 arranged closest to fuel pump 104A detected the emergency word, informing the system of an emergency around fuel pump 104A. Step 510 includes terminating operation of any active fuel pumps within the forecourt 102. In some implementations, once the first disable signal is sent to the fuel pump closet to the emergency, then a secondary disable signal may be sent from the forecourt controller 106 to the remaining fuel pumps within the forecourt 102 to aid in containing the emergency situation. Step 512 includes announcing an audible emergency signal within the immediate area of the forecourt to inform bystanders and users of an emergency situation. The audible emergency signal can be out through speakers arranged about the forecourt 102.

Figure 6:
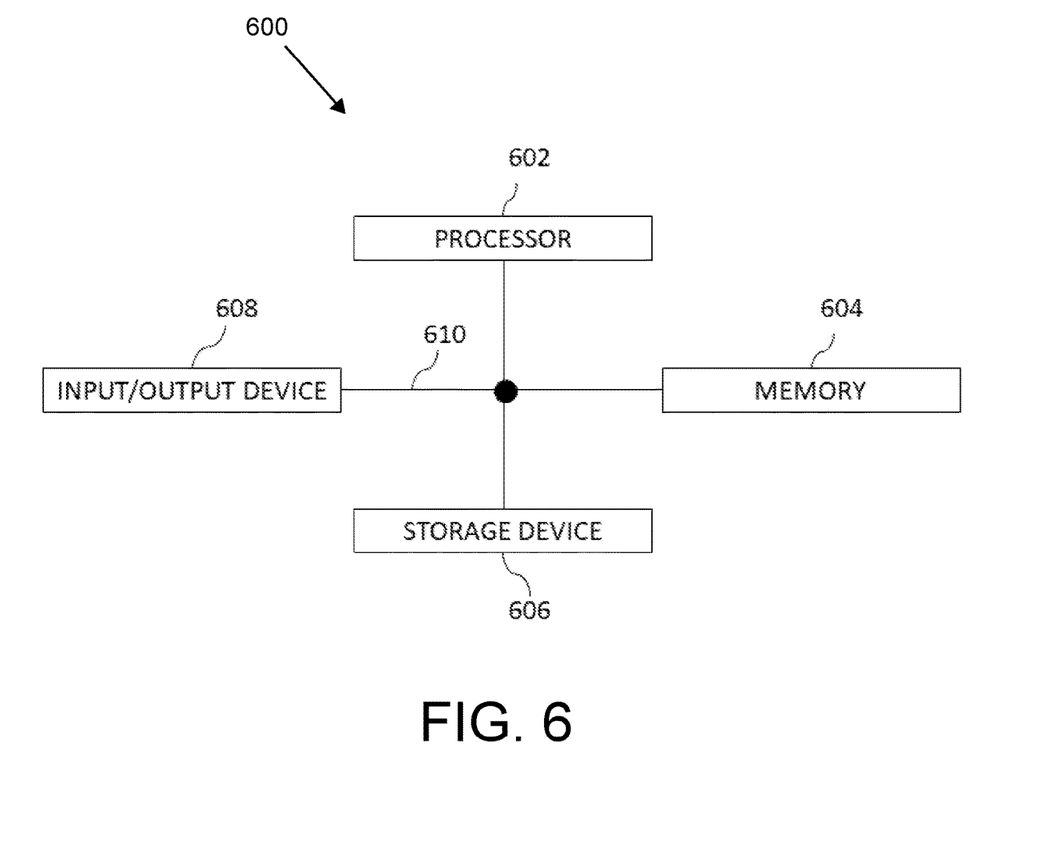
FIG. 6 shows a schematic view of a computer system which can implement the methods shown in FIGS. 2-5.

In some implementations, the current subject matter can be configured to be implemented in a system 600, as shown in FIG. 6. The system 600 can include one or more of a processor 602, a memory 604, a storage device 606, and an input/output device 608. Each of the components 602, 604, 606 and 608 can be interconnected using a system bus 610. The processor 602 can be configured to process instructions for execution within the system 600. In some implementations, the processor 602 can be a single-threaded processor. In alternate implementations, the processor 602 can be a multi-threaded processor. The processor 602 can be further configured to process instructions stored in the memory 604 or on the storage device 606, including receiving or sending information through the input/output device 608. The memory 604 can store information within the system 600. In some implementations, the memory 604 can be a computer-readable medium. In alternate implementations, the memory 604 can be a volatile memory unit. In yet some implementations, the memory 604 can be a non-volatile memory unit. The storage device 606 can be capable of providing mass storage for the system 600. In some implementations, the storage device 606 can be a computer-readable medium. In alternate implementations, the storage device 606 can be a floppy disk device, a hard disk device, an optical disk device, a tape device, non-volatile solid state memory, or any other type of storage device. The input/output device 608 can be configured to provide input/output operations for the system 600. In some implementations, the input/output device 608 can include a keyboard and/or pointing device. In alternate implementations, the input/output device 608 can include a display unit for displaying graphical user interfaces.

As set forth herein, a forecourt control system and method according to exemplary embodiments of the present disclosure includes a forecourt controller for activating fuel pumps, and a voice recognition controller for comparing voice patterns of audible input commands with stored voice patterns within a database. Accordingly, the forecourt control systems and methods according to the present disclosure can provide an efficiency gain by allowing a user to verbally input commands into the forecourt control system, while also providing additional security by ensuring an authorized user is inputting the commands. The forecourt control system and method according to the present disclosure can be used for various dispensing applications, distribution applications, or the like.

The present disclosure is not limited to the exemplary embodiments described herein and can be embodied in variations and modifications. The exemplary embodiments are provided merely to allow one of ordinary skill in the art to understand the scope of the present disclosure, which will be defined by the scope of the claims. Accordingly, in some embodiments, well-known operations of a process, well-known structures, and well-known technologies are not be described in detail to avoid obscure understanding of the present disclosure. Throughout the specification, same reference numerals refer to same elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor can receive instructions and data from a read only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiments. Various modifications and changes can be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. A method, comprising:
    receiving a first set of data characterizing an audible activation word including a first voice pattern;
    authorizing control of an at least one fuel pump from a plurality of fuel pumps in response to the first voice pattern matching a stored voice pattern within a database, wherein each of the plurality of fuel pumps is communicatively connected to a forecourt controller, wherein the authorization control of the at least one fuel pump terminates after a predetermined time;
    receiving a second set of data characterizing an audible command word, wherein the audible command word includes a second voice pattern; and
    controlling the at least one fuel pump based on the audible command word and in response to the second voice pattern matching the stored voice pattern within the database.

2. The method of claim 1, further comprising:
    receiving a third data set characterizing an audible termination word including a termination word and a third voice pattern;
    comparing the third voice pattern of the audible termination word to the database; and
    terminating the authorization control of the at least one fuel pump in response to the third voice pattern matching the stored voice pattern within the database.

3. The method of claim 1, wherein the database is wirelessly connected to each of the fuel pumps of the plurality of fuel pumps.

4. The method of claim 3, wherein the database includes a plurality of stored voice patterns.

5. The method of claim 4, wherein the stored voice patterns are previously recorded activation words and command words that each correspond to a different user.

6. The method of claim 1, further comprising:
    receiving a third data set characterizing an audible emergency word;
    comparing the audible emergency word to a stored emergency word within the database; and
    disabling the at least one fuel pump in response to the audible emergency word matching the stored audible emergency phrase within the database.

7. The method of claim 1, further comprising:
    receiving a third data set characterizing an audible emergency word including an emergency word and a third voice pattern;
    comparing the third voice pattern of the audible emergency word to the database; and
    activating an emergency procedure in response to the third voice pattern matching the stored voice pattern within the database.

8. The method of claim 7, wherein the emergency procedure comprises:
    terminating operation of a fuel pump closest to a location where the third data set was received;
    terminating operation of each of the plurality of fuel pumps within the forecourt; and/or
    announcing an audible emergency signal.

9. The method of claim 1, wherein the audible command word is a predetermined word stored within the database.

10. The method of claim 9, wherein the audible command word activates the at least one fuel pump and/or controls the at least one fuel pump to dispense a specific amount of fuel.

11. The method of claim 1, wherein a plurality of audible command words are received during the authorization control of the at least one fuel pump.

12. The method of claim 1, wherein the stored voice pattern corresponds to a voice pattern of a user.

13. A system, comprising:
- a forecourt controller including circuitry configured to activate an at least one fuel pump of a plurality of fuel pumps based on an audible command word including a voice pattern;
- a database communicatively connected to the forecourt controller and configured to contain a plurality of stored voice patterns;
- a voice recognition controller communicatively connected to the forecourt controller and configured to compare the voice pattern of the audible command word to the plurality of stored voice patterns;
- an audio sensor communicatively connected to the voice recognition controller and configured to receive the audible command word from a user,
- wherein the at least one fuel pump is activated in response to the voice pattern of the audible command word matching at least one of the plurality of stored voice patterns, wherein the activation of the at least one fuel pump terminates after a predetermined time.

14. The system of claim 13, wherein the database is wirelessly connected to the forecourt controller.

15. The system of claim 13, wherein the at least one fuel pump is activated in response to the voice pattern of the audible command word matching at least one of the plurality of stored voice patterns.

16. The system of claim 13, further comprising a second audio sensor arranged proximate to the at least one fuel pump and configured to receive an audible emergency word.

17. A system, comprising:
- a plurality of fuel pumps arranged in the forecourt;
- a forecourt controller including circuitry communicatively connected to at least one of the plurality of fuel pumps;
- a database communicatively connected to the forecourt controller and configured to contain a plurality of stored voice patterns;
- a voice recognition controller including circuitry communicatively connected to the forecourt controller;
- an audio sensor communicatively connected to the voice recognition controller,
- wherein the system is configured to:
  - receive a first set of data characterizing an audible activation word including a first voice pattern;
  - authorize control of the at least one fuel pump in response to the first voice pattern matching a stored voice pattern within a database, wherein the authorization control of the at least one fuel pump terminates after a predetermined time;
  - receive a second set of data characterizing an audible command word, wherein the audible command word includes a second voice pattern; and
  - control the at least one fuel pump based on the audible command word in response to the second voice pattern matching the stored voice pattern within the database.

18. The system of claim 17, further comprising a second audio sensor arranged proximate to the at least one fuel pump and configured to receive an audible emergency word.

* * * * *